US012513714B2

(12) United States Patent
Guo et al.

(10) Patent No.: US 12,513,714 B2
(45) Date of Patent: Dec. 30, 2025

(54) RECEIVER SIDE PROTECTION WITH RESOURCE FORWARDING IN SIDELINK

(71) Applicant: QUALCOMM Incorporated, San Diego, CA (US)

(72) Inventors: Hui Guo, Beijing (CN); Kapil Gulati, Belle Mead, NJ (US); Sudhir Kumar Baghel, Pleasanton, CA (US); Tien Viet Nguyen, Bridgewater, NJ (US); Gabi Sarkis, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 408 days.

(21) Appl. No.: 17/905,537

(22) PCT Filed: Apr. 16, 2020

(86) PCT No.: PCT/CN2020/085145
§ 371 (c)(1),
(2) Date: Sep. 2, 2022

(87) PCT Pub. No.: WO2021/208021
PCT Pub. Date: Oct. 21, 2021

(65) Prior Publication Data
US 2023/0120455 A1 Apr. 20, 2023

(51) Int. Cl.
H04W 72/25 (2023.01)
H04W 72/04 (2023.01)
H04W 72/541 (2023.01)

(52) U.S. Cl.
CPC .......... H04W 72/25 (2023.01); H04W 72/04 (2013.01); H04W 72/541 (2023.01)

(58) Field of Classification Search
CPC ..... H04W 72/25; H04W 72/04; H04W 74/00; H04W 72/54; H04W 72/02; H04W 72/12;
(Continued)

(56) References Cited

U.S. PATENT DOCUMENTS 9,516,570 B2 * 12/2016 Siomina ............. H04W 36/326
9,693,338 B2 *  6/2017 Zhao ................... H04W 56/002
(Continued)

FOREIGN PATENT DOCUMENTS

CN 109245869 A 1/2019
CN 110383866 A 10/2019
(Continued)

OTHER PUBLICATIONS

International Search Report and Written Opinion—PCT/CN2020/085145—ISA/EPO—Jan. 15, 2021.
(Continued)

Primary Examiner — Man U Phan
(74) Attorney, Agent, or Firm — Patterson & Sheridan, LLP

(57) ABSTRACT

Certain aspects of the present disclosure provide techniques for receiver side protection in sidelink communications. In certain aspects, a method performed by an apparatus generally includes obtaining, from a first user equipment (UE), first control information, which includes a first resource allocation information of one or more resources allocated for transmission by the first UE to the apparatus and an indication of a first cell associated with the first UE. The method generally includes obtaining, from a second UE, second control information, which generally includes a second resource allocation information of resources allocated for transmission by the second UE to the apparatus and an indication of a second cell associated with the second UE. The method generally includes determining, based on the first and second control information, potential interference from transmissions by the first UE and the second UE and taking one or more actions to mitigate the potential interference.

33 Claims, 16 Drawing Sheets

(58) Field of Classification Search
CPC ..... H04W 72/08; H04W 72/40; H04W 72/56; H04W 76/14; H04W 84/18; H04W 16/14; H04L 1/18; H04L 5/00; H04L 12/00; H04L 1/00
USPC .......................................................... 370/329
See application file for complete search history.

(56) References Cited

U.S. PATENT DOCUMENTS

| | | | | |
|---|---|---|---|---|
| 10,135,569 | B2* | 11/2018 | Liu | H04J 11/005 |
| 10,159,061 | B2* | 12/2018 | Zhao | H04W 56/002 |
| 10,256,855 | B2 | 4/2019 | Xu et al. | |
| 10,383,147 | B2* | 8/2019 | Rajagopal | H04W 74/0816 |
| 10,932,231 | B2* | 2/2021 | Zhao | H04W 72/541 |
| 11,115,835 | B2* | 9/2021 | Byun | H04W 48/16 |
| 11,317,383 | B2* | 4/2022 | Thomas | H04W 74/002 |
| 11,665,701 | B2* | 5/2023 | Akkarakaran | H04L 5/0094 370/329 |
| 11,671,946 | B2* | 6/2023 | Thomas | H04W 4/40 370/329 |
| 11,818,568 | B2* | 11/2023 | Ashraf | H04W 76/14 |
| 12,143,230 | B2* | 11/2024 | Park | H04L 1/1893 |
| 2018/0035435 | A1* | 2/2018 | Gupta | H04L 5/0092 |
| 2020/0100119 | A1 | 3/2020 | Byun et al. | |

FOREIGN PATENT DOCUMENTS

| | | |
|---|---|---|
| WO | 2015116383 | 8/2015 |
| WO | 2017135998 A1 | 8/2017 |
| WO | 2019015868 A1 | 1/2019 |
| WO | 2019096705 A1 | 5/2019 |

OTHER PUBLICATIONS

Supplementary European Search Report—EP20931617—Search Authority—The Hague—Dec. 15, 2023.

CATT: "On Mode 2 Resource allocation in NR V2X", 3GPP TSG RAN WG1 Meeting #97, R1-1906316, May 13, 2019-May 17, 2019, May 4, 2019, 10 Pages, XP051727766, section 3.

Huawei, et al., "Sidelink Resource Allocation Mode 1", 3GPP TSG RAN WG1 Meeting #98bis, R1-1910055, Chongqing, China, Oct. 14, 2019-Oct. 20, 2019, Oct. 8, 2019, 19 Pages, Section 2 & 3.

* cited by examiner

RECEIVER SIDE PROTECTION WITH RESOURCE FORWARDING IN SIDELINK

CROSS-REFERENCE OF RELATED APPLICATION(S)

This application is a national stage application under 35 U.S.C. 371 which claims benefit of and priority to International Application No. PCT/CN2020/085145, filed Apr. 16, 2020, which is hereby assigned to the assignee hereof, and hereby expressly incorporated by reference herein in its entirety as if fully set forth below and for all applicable purposes.

BACKGROUND

Field of the Disclosure

Aspects of the present disclosure relate to wireless communications, and more particularly, to techniques for receiver side protection with resource forwarding in sidelink.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved receiver side protection in sidelink communication.

Certain aspects of the subject matter described in this disclosure can be implemented in a method for wireless communication by an apparatus. The method generally includes obtaining, from at least a first user equipment (UE), first control information. The first control information generally includes a first resource allocation information of one or more resources allocated for transmission by the first UE to the apparatus and an indication of a first cell associated with the first UE. The method generally includes obtaining, from at least a second UE, second control information. The second control information generally includes a second resource allocation information of one or more resources allocated for transmission by the second UE to the apparatus and an indication of a second cell associated with the second UE. The method generally includes determining, based on the first and second control information, potential interference from transmissions by the first UE and the second UE and taking one or more actions to mitigate the potential interference.

Certain aspects of the subject matter described in this disclosure can be implemented in a method for wireless communication by an apparatus. The method generally includes generating a grant that allocates one or more resources to a first user equipment (UE) for transmission to a second UE, outputting the grant for transmission to the first UE, and obtaining an indication for resource reconfiguration from the second UE. The method generally includes in response to the indication, generating a second grant that allocates one or more other resources to the first UE for transmission to the second UE and outputting the second grant for transmission to the first UE.

Certain aspects of the subject matter described in this disclosure can be implemented in a method for wireless communication by a wireless node. The method generally includes coordinating sidelink resource scheduling with one or more wireless nodes associated with different cells to mitigate potential interference, generating a grant allocating one or more resources to a first user equipment (UE) for wireless communications with a second UE based on the coordination, and outputting the grant for transmission to the first UE.

Certain aspects of the subject matter described in this disclosure can be implemented in an apparatus for wireless communications. The apparatus generally includes an interface configured to (1) obtain first control information from at least a first user equipment (UE), the first control information including a first resource allocation information of one or more resources allocated for transmission by the first UE to the apparatus and an indication of a first cell associated with the first UE and (2) obtain second control information from at least a second UE, the second control information including a second resource allocation information of one or more resources allocated for transmission by the second UE to the apparatus and an indication of a second cell associated with the second UE and a processing system configured to determine, based on the first and second control information, potential interference from transmissions by the first UE and the second UE and take one or more actions to mitigate the potential interference.

Certain aspects of the subject matter described in this disclosure can be implemented in an apparatus for wireless communications. The apparatus generally includes a processing system configured to generate a grant that allocates one or more resources to a first user equipment (UE) for transmission to a second UE and an interface configured to output the grant for transmission to the first UE and obtain an indication for resource reconfiguration from the second UE, wherein in response to the indication, the processing system is further configured to generate a second grant that allocates one or more other resources to the first UE for transmission to the second UE and the interface is further configured to output the second grant for transmission to the first UE.

Certain aspects of the subject matter described in this disclosure can be implemented in an apparatus for wireless communications. The apparatus generally includes a processing system configured to coordinate sidelink resource scheduling with one or more wireless nodes associated with different cells to mitigate potential interference and generate a grant allocating one or more resources to a first user equipment (UE) for wireless communications with a second UE based on the coordination and an interface configured to output the grant for transmission to the first UE.

Certain aspects of the subject matter described in this disclosure can be implemented in an apparatus for wireless communications. The apparatus generally includes means for obtaining first control information from at least a first user equipment (UE), the first control information including a first resource allocation information of one or more resources allocated for transmission by the first UE to the apparatus and an indication of a first cell associated with the first UE, means for obtaining second control information from at least a second UE, the second control information including a second resource allocation information of one or more resources allocated for transmission by the second UE to the apparatus and an indication of a second cell associated with the second UE, means for determining, based on the first and second control information, potential interference from transmissions by the first UE and the second UE and means for taking one or more actions to mitigate the potential interference.

Certain aspects of the subject matter described in this disclosure can be implemented in an apparatus for wireless communications. The apparatus generally includes means for generating a grant that allocates one or more resources to a first user equipment (UE) for transmission to a second UE, means for outputting the grant for transmission to the first UE, means for obtaining an indication for resource reconfiguration from the second UE, means for generating a second grant that allocates one or more other resources to the first UE for transmission to the second UE and means for outputting the second grant for transmission to the first UE.

Certain aspects of the subject matter described in this disclosure can be implemented in an apparatus for wireless communications. The apparatus generally includes means for coordinating sidelink resource scheduling with one or more wireless nodes associated with different cells to mitigate potential interference, means for generating a grant allocating one or more resources to a first user equipment (UE) for wireless communications with a second UE based on the coordination and means for outputting the grant for transmission to the first UE.

Certain aspects of the subject matter described in this disclosure can be implemented in a user equipment (UE). The UE generally includes a receiver configured to receive first control information from at least a first user equipment (UE), the first control information including a first resource allocation information of one or more resources allocated for transmission by the first UE to the UE and an indication of a first cell associated with the first UE, and receive second control information from at least a second UE, the second control information including a second resource allocation information of one or more resources allocated for transmission by the second UE to the UE and an indication of a second cell associated with the second UE, and a processing system configured to determine, based on the first and second control information, potential interference from transmissions by the first UE and the second UE and take one or more actions to mitigate the potential interference.

Certain aspects of the subject matter described in this disclosure can be implemented in a wireless node. The wireless node generally includes a processing system configured to generate a grant that allocates one or more resources to a first user equipment (UE) for transmission to a second UE, a transmitter configured transmit the grant to the first UE and a receiver configured to receive an indication for resource reconfiguration from the second UE, wherein in response to the indication, the processing system is further configured to generate a second grant that allocates one or more other resources to the first UE for transmission to the second UE and the transmitter is further configured to transmit the second grant to the first UE.

Certain aspects of the subject matter described in this disclosure can be implemented in a first wireless node. The first wireless node generally includes a processing system configured to coordinate sidelink resource scheduling with one or more wireless nodes associated with different cells to mitigate potential interference and generating a grant allocating one or more resources to a first user equipment (UE) for wireless communications with a second UE based on the coordination and a transmitter configured to transmit the grant to the first UE.

Certain aspects of the subject matter described in this disclosure can be implemented in a non-transitory computer-readable medium for wireless communications. The non-transitory computer-readable medium generally includes instructions executable to obtain first control information from at least a first user equipment (UE), the first control information including a first resource allocation information of one or more resources allocated for transmission by the first UE to the apparatus and an indication of a first cell associated with the first UE, obtain second control information from at least a second UE, the second control information including a second resource allocation information of one or more resources allocated for transmission by the second UE to the apparatus and an indication of a second cell associated with the second UE, determine, based on the first and second control information, potential interference from transmissions by the first UE and the second UE, and take one or more actions to mitigate the potential interference.

Certain aspects of the subject matter described in this disclosure can be implemented in a non-transitory computer-readable medium for wireless communications. The non-transitory computer-readable medium generally includes instructions executable to generate a grant that allocates one or more resources to a first user equipment (UE) for transmission to a second UE, output the grant for transmission to the first UE, obtain an indication for resource reconfiguration from the second UE, generate a second grant that allocates one or more other resources to the first UE for transmission to the second UE, and output the second grant for transmission to the first UE.

Certain aspects of the subject matter described in this disclosure can be implemented in a non-transitory computer-readable medium for wireless communications. The non-transitory computer-readable medium generally includes instructions executable to coordinate sidelink resource scheduling with one or more wireless nodes associated with different cells to mitigate potential interference, generate a grant allocating one or more resources to a first user equipment (UE) for wireless communications with a second UE based on the coordination, and output the grant for transmission to the first UE.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
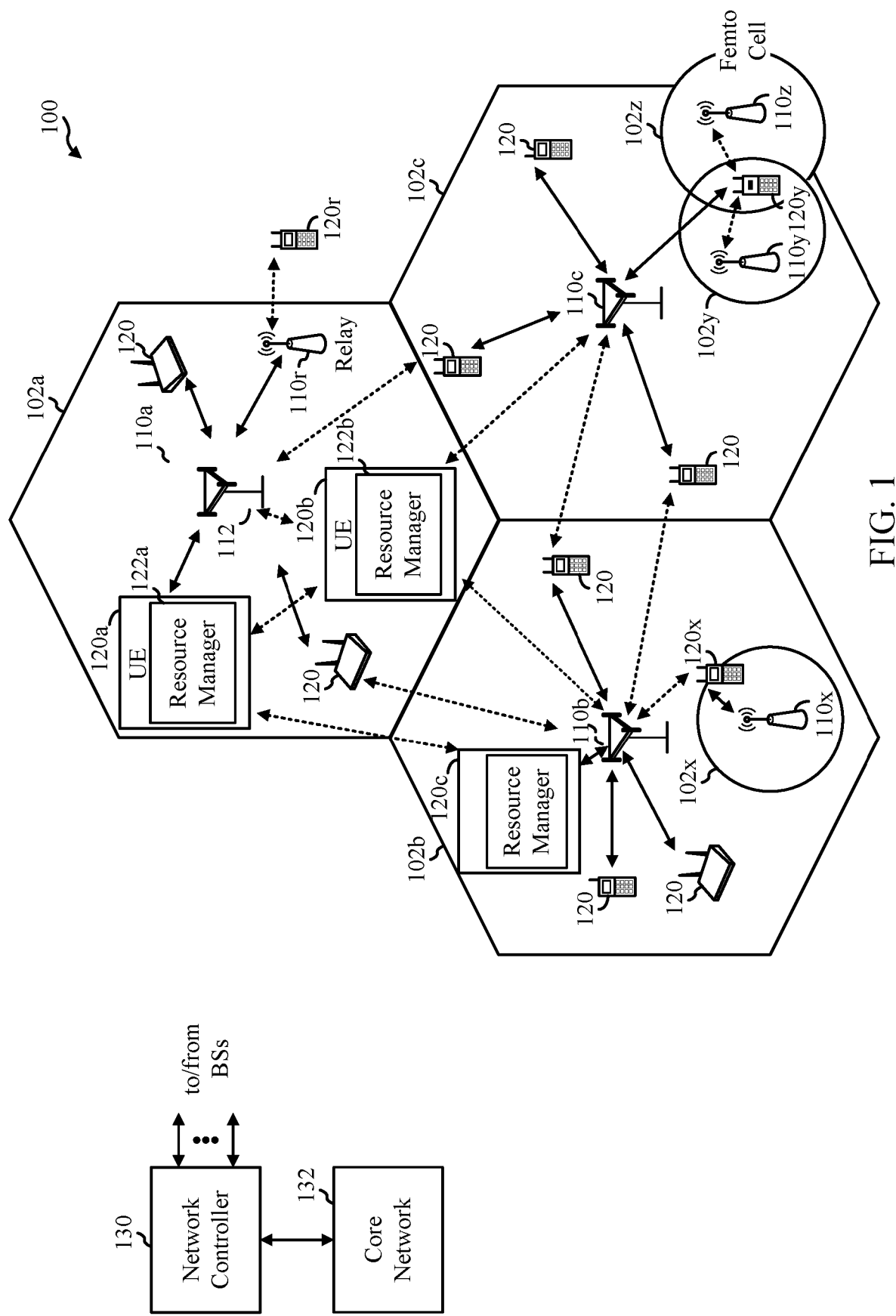
FIG. 1 is a block diagram conceptually illustrating an example wireless communication network, in accordance with certain aspects of the present disclosure.

Aspects of the present disclosure provide apparatus, methods, processing systems, and computer readable mediums for receiver side protection in sidelink communication. In particular, certain aspects of the present disclosure provide advantages for improved sidelink communication to avoid overlapping resource grants.

When there are multiple transmitting UEs connected to different cells (e.g., gNBs), resource allocation and transmission may lead to resource collisions (e.g., overlapping resource grants). For example, when one UE is the intended receiver of transmissions from multiple (e.g., two or more) transmitting UEs, it may be very likely that the UE will receive on the same frequency and/or time resource(s) from different cells. Without proper coordination or resource allocation among transmitting UEs, high inter-cell interference and poor reception performance by the receiving UE(s) may occur, as further described herein with FIG. 5.

Accordingly, certain aspects of the present disclosure provides techniques and apparatus for a sidelink process of receiver side protection. In some examples, the cell identifier (ID) may include in the grant, so that the receiver user equipment (UE) can identify potential inter-cell interference. In some examples, a receiver UE can forward a resource allocation information from one cell to another cell. In some examples, interference cancelation may be performed by the receiver UE. In some examples, inter-cell coordination can be performed to reduce or mitigate collisions.

The following description provides examples of receiver side protection in sidelink communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QOS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

According to certain aspects, the BSs 110 and UEs 120 may be configured for resource allocation for receiver side protection in sidelink. As shown in FIG. 1, the BS 110a includes a resource manager 112 that allocates resources for receiver side protection in sidelink, in accordance with aspects of the present disclosure. The UEs 120a, 120b, 120c include a resource manager 122a, 122b, and 122c, respectively, that may be configured for receiver side protection in sidelink, in accordance with aspects of the present disclosure.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
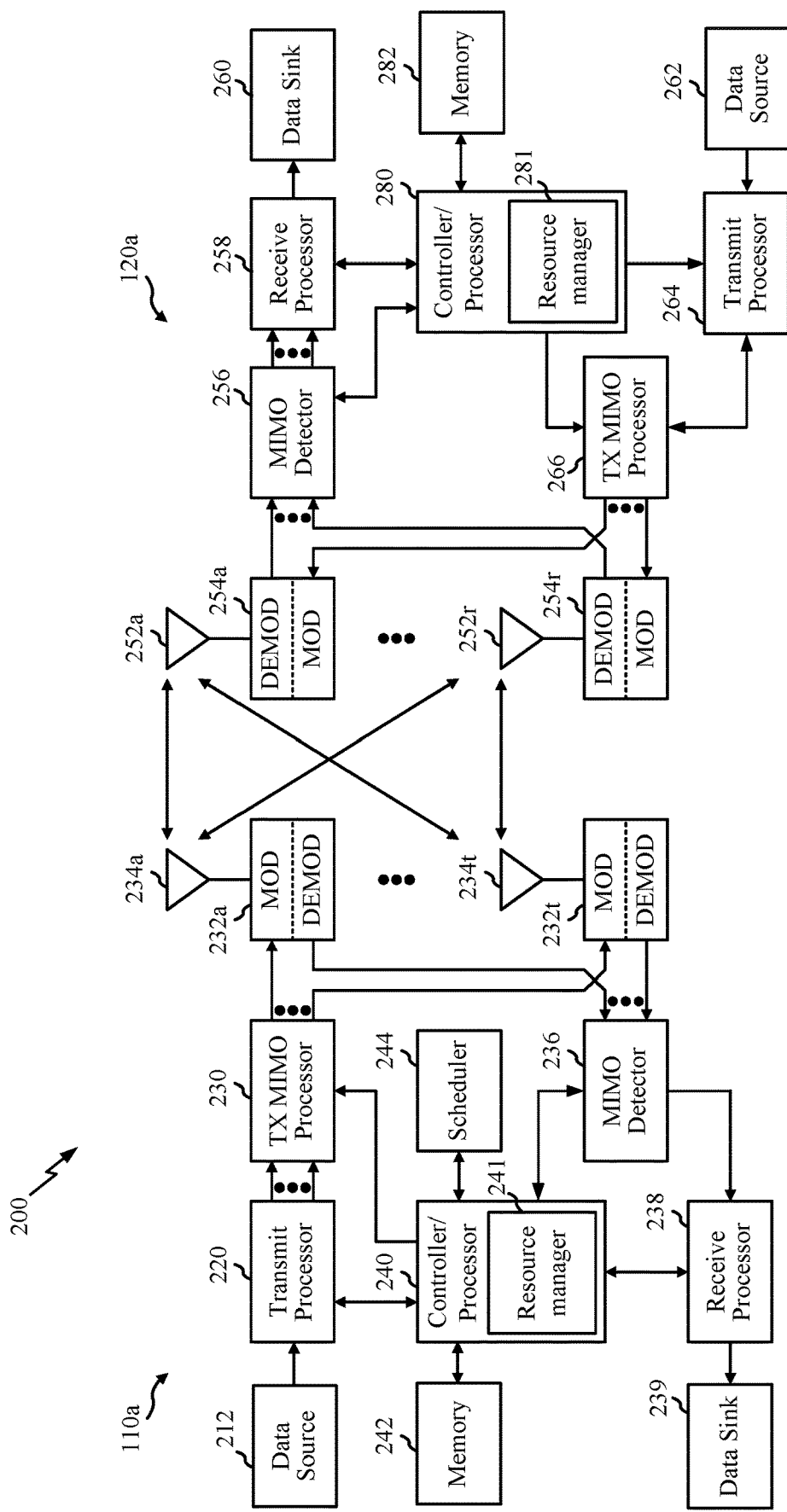
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., which could also be a UE 120b or UE 120c), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the demodulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a resource manager 241 that allocates resources for receiver side protection in sidelink, according to aspects described herein. As shown in FIG. 2, the controller/processor 280 of the UE 120a has a resource manager 281 that may be configured for receiver side protection in sidelink, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
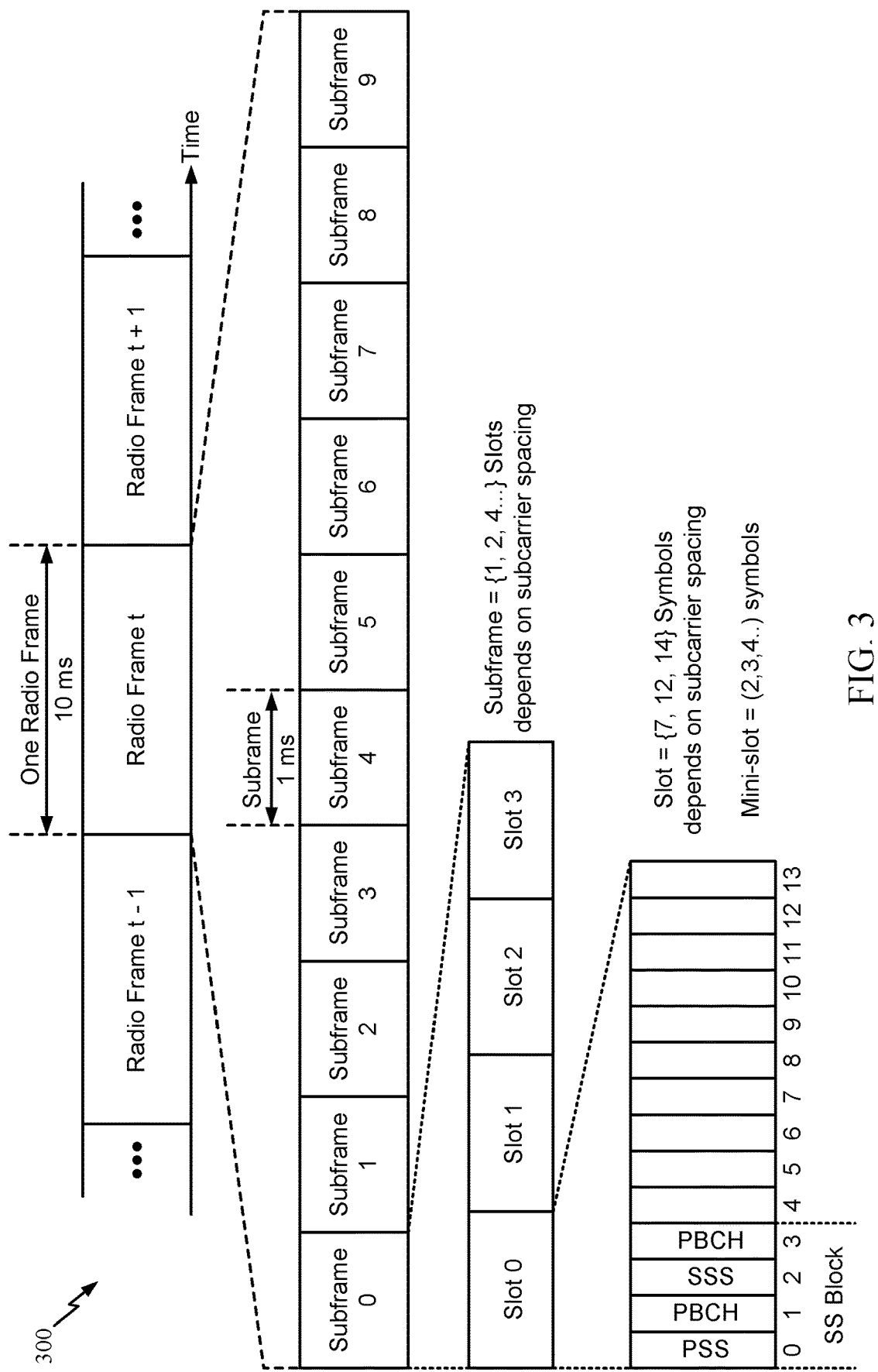
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

In some examples, the communication between the UEs 120 and BSs 110 is referred to as the access link. The access link may be provided via a Uu interface. Communication between devices may be referred as the sidelink.

In some examples, two or more subordinate entities (e.g., UEs 120) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE 120a) to another subordinate entity (e.g., another UE 120) without relaying that communication through the scheduling entity (e.g., UE 120 or BS 110), even though the scheduling entity may be utilized for scheduling and/or control purposes. In some examples, the sidelink signals may be communicated using a licensed spectrum (unlike wireless local area networks, which typically use an unlicensed spectrum). One example of sidelink communication is PC5, for example, as used in V2V, LTE, and/or NR.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions. The PSFCH may carry feedback such as CSI related to a sidelink channel quality.

Figure 4B:
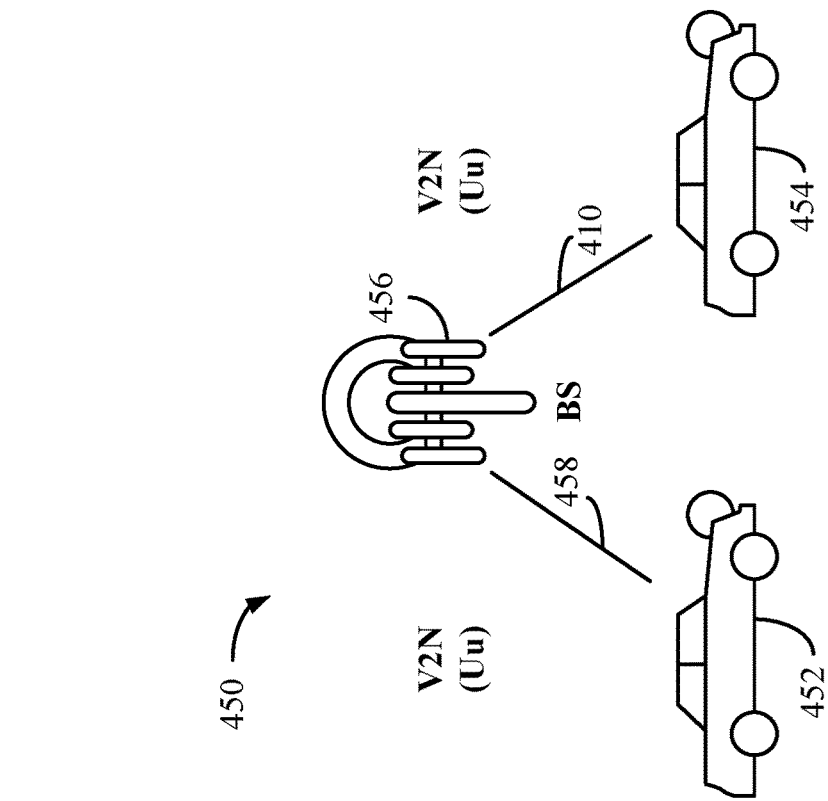
FIG. 4A and FIG. 4B show diagrammatic representations of example vehicle to everything (V2X) systems, in accordance with certain aspects of the present disclosure.
Figure 4A:
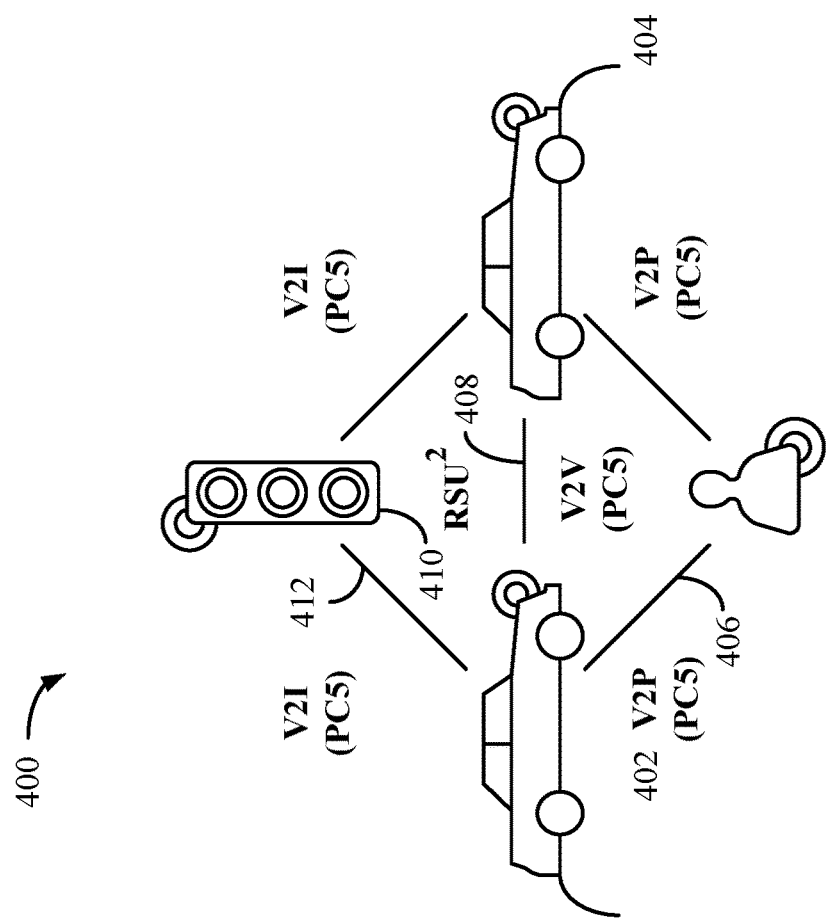

FIG. 4A and FIG. 4B show diagrammatic representations of example V2X systems, in accordance with some aspects of the present disclosure. For example, the vehicles shown in FIG. 4A and FIG. 4B may communicate via sidelink channels and may perform sidelink CSI reporting as described herein.

The V2X systems, provided in FIG. 4A and FIG. 4B provide two complementary transmission modes. A first transmission mode, shown by way of example in FIG. 4A, involves direct communications (for example, also referred to as side link communications) between participants in proximity to one another in a local area. A second transmission mode, shown by way of example in FIG. 4B, involves network communications through a network, which may be implemented over a Uu interface (for example, a wireless communication interface between a radio access network (RAN) and a UE).

Referring to FIG. 4A, a V2X system 400 (for example, including vehicle to vehicle (V2V) communications) is illustrated with two vehicles 402, 404. The first transmission mode allows for direct communication between different participants in a given geographic location. As illustrated, a vehicle can have a wireless communication link 406 with an individual (V2P) (for example, via a UE) through a PC5 interface. Communications between the vehicles 402 and 404 may also occur through a PC5 interface 408. In a like manner, communication may occur from a vehicle 402 to other highway components (for example, highway component 410), such as a traffic signal or sign (V2I) through a PC5 interface 412. With respect to each communication link illustrated in FIG. 4A, two-way communication may take place between elements, therefore each element may be a transmitter and a receiver of information. The V2X system 400 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 4B shows a V2X system 450 for communication between a vehicle 452 and a vehicle 454 through a network entity 456. These network communications may occur through discrete nodes, such as a BS (e.g., the BS 110a), that sends and receives information to and from (for example, relays information between) vehicles 452, 454. The network communications through vehicle to network (V2N) links 458 and 410 may be used, for example, for long range communications between vehicles, such as for communicating the presence of a car accident a distance ahead along a road or highway. Other types of communications may be sent by the wireless node to vehicles, such as traffic flow conditions, road hazard warnings, environmental/weather reports, and service station availability, among other examples. Such data can be obtained from cloud-based sharing services.

Roadside units (RSUs) may be utilized. An RSU may be used for V2I communications. In some examples, an RSU may act as a forwarding node to extend coverage for a UE. In some examples, an RSU may be co-located with a BS or may be standalone. RSUs can have different classifications. For example, RSUs can be classified into UE-type RSUs and Micro NodeB-type RSUs. Micro NB-type RSUs have similar functionality as the Macro eNB/gNB. The Micro NB-type RSUs can utilize the Uu interface. UE-type RSUs can be used for meeting tight quality-of-service (QOS) requirements by minimizing collisions and improving reliability. UE-type RSUs may use centralized resource allocation mechanisms to allow for efficient resource utilization. Critical information (e.g., such as traffic conditions, weather conditions, congestion statistics, sensor data, etc.) can be broadcast to UEs in the coverage area. Relays can re-broadcasts critical information received from some UEs. UE-type RSUs may be a reliable synchronization source.

Certain aspects of the present disclosure generally relate to techniques for receiver side protection in sidelink with resource forwarding. In particular, certain aspects of the present disclosure provide advantages for improved sidelink communication to avoid overlapping resource grants.

Figure 5:
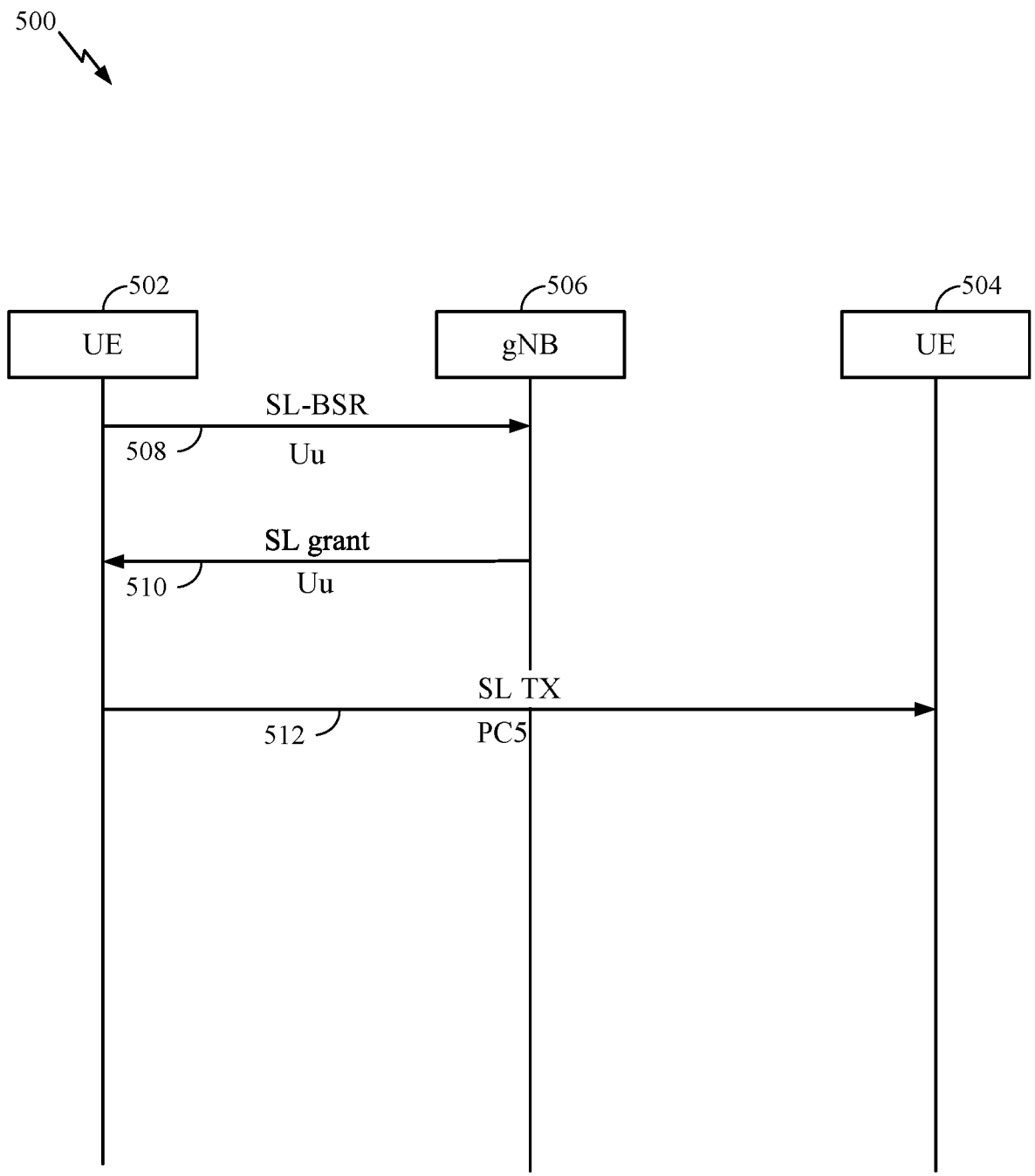
FIG. 5 is a call flow diagram illustrating example resource allocation for sidelink transmission, in accordance with certain aspects of the present disclosure.

In one resource allocation mode, a serving gNB may allocate sidelink resources for transmission to one or more UEs. As shown in FIG. 5, the UE 502 may send a sidelink buffer status report (SL-BSR) at 508 to the serving gNB 506. The gNB 506 receives the SL-BSR and grants resources, at 510, to the UE 502 for sidelink transmission to the receiving UE 504. At 512, the UE 502 sends a SL transmission (e.g., via PC5) to the UE 504 using the granted resources.

Figure 6:
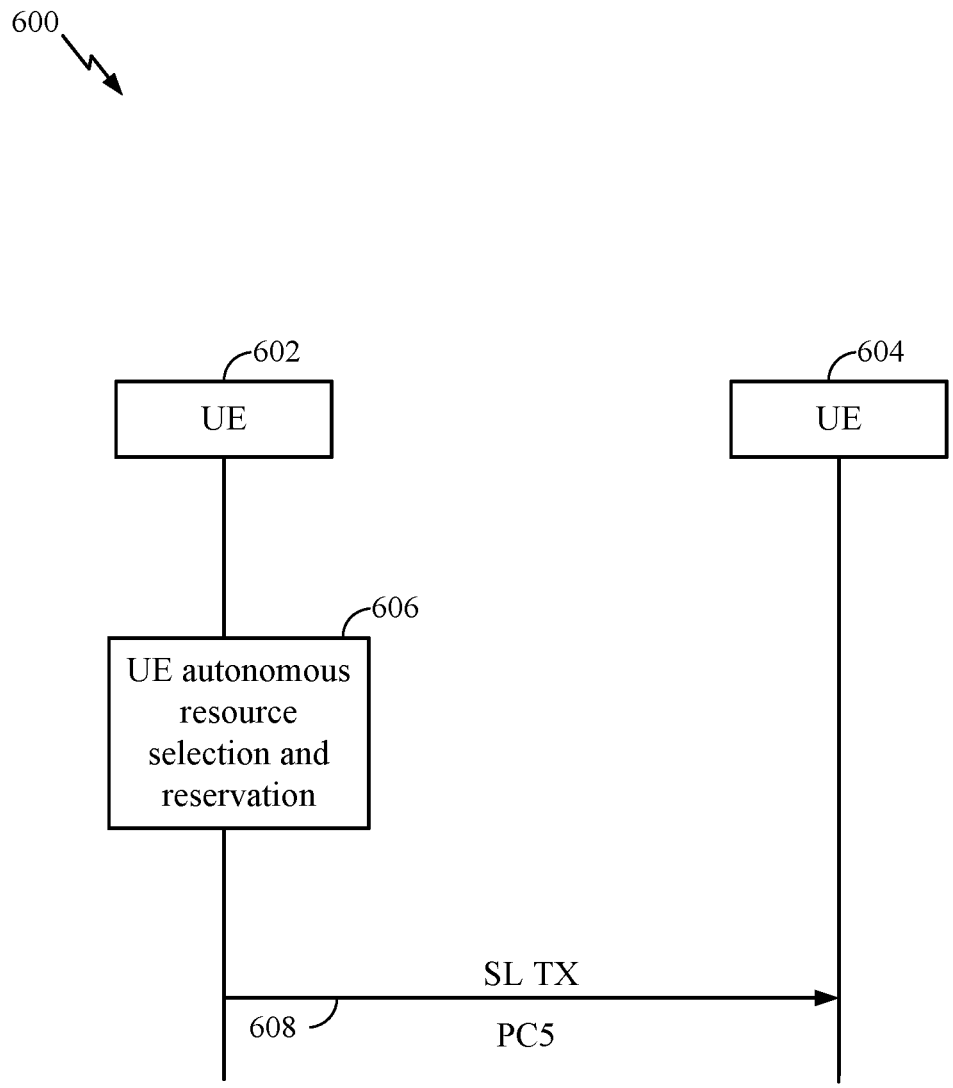
FIG. 6 is a call flow diagram illustrating example autonomous resource selection for sidelink transmission, in accordance with certain aspects of the present disclosure.

In another resource allocation mode, the UEs may autonomously select sidelink time and/or frequency resources. As shown in FIG. 6, at 606, a transmitting UE 602 autonomously selects and reserves resources for transmission. At 608, the transmitting UE 602 sends a SL transmission to the receiving UE 604 using the autonomously selected resources.

When there are multiple transmitting UEs connected to different cells (e.g., gNBs), resource allocation and transmission may lead to resource collisions (e.g., overlapping resource grants). For example, when one UE is the intended receiver of transmissions from multiple (e.g., two or more) transmitting UEs, it may be very likely that the UE will receive on the same frequency and/or time resource(s) from different cells. Without proper coordination or resource allocation among transmitting UEs, high inter-cell interference and poor reception performance by the receiving UE(s) may occur. Even in a system with only one transmitting UE (e.g., FIG. 5), when the gNB 506 schedules sidelink resources with a grant after receiving the SL-BSR from the transmitting UE 502, the gNB 506 may have no knowledge the intended receiving UE 504 of the corresponding transmission.

Figure 7:
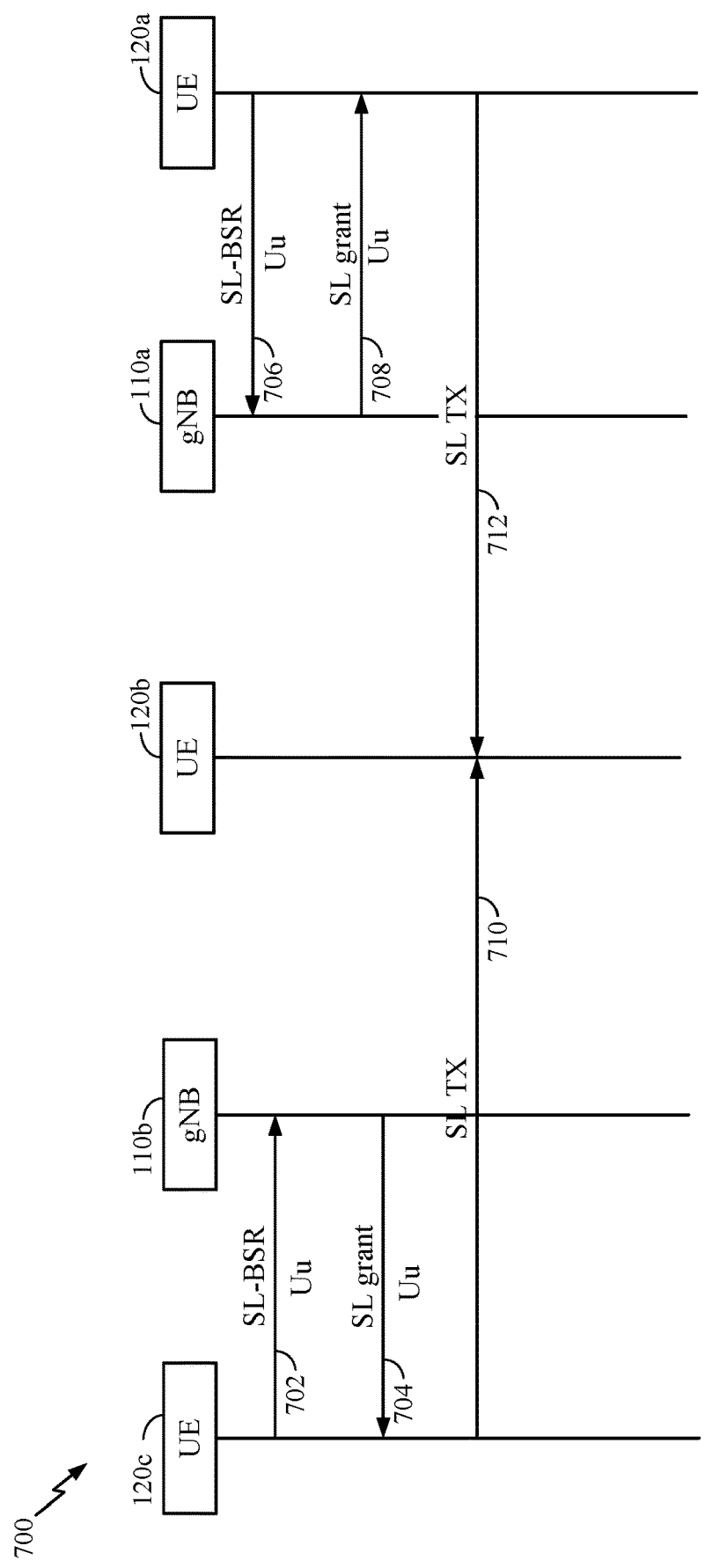
FIG. 7 is a call flow diagram illustrating example colliding resource allocations for sidelink transmission, in accordance with certain aspects of the present disclosure.

FIG. 7 is a call flow diagram 700 depicting multiple transmitting UEs connected to various gNBs. Each of UEs 120a and 120c may, at 702 and 706 respectively, transmit a SL-BSR to the serving gNBs 110a and 110b respectively. The SL-BSR may provide information about SL data volume for associated logical channel identifiers (LCIDs). The SL-BSR may include the destination identifier (ID). The transmitting UEs 120a and 120c receive SL grants, at 704 and 708, respectively, from the corresponding serving gNBs 110a and 110b. As shown in FIG. 7, the UEs 120c and UE 120a may each receive grants allocating overlapping resources for transmission to the same UE 120b. Thus, the UEs 120a and 120c may transmit at 710 and 712, respectively, to the UE 120b using overlapping resources. In this case, the UE 120b is the receiver from multiple transmitting UEs belonging to different cells, which may result in inter-cell interference and poor receiving performance at the UE 120b.

Therefore, what is needed are techniques and apparatus for receiver side protection in sidelink, for example, to reduce or avoid inter-cell interference and improve receiver performance.

Example Receiver Side Protection in Sidelink

Accordingly, certain aspects of the present disclosure provides techniques and apparatus for a sidelink process of receiver side protection. In some examples, the cell identifier (ID) may include in the grant, so that the receiver user equipment (UE) can identify potential inter-cell interference. In some examples, a receiver UE can forward a resource allocation information from one cell to another cell. In some examples, interference cancelation may be performed by the receiver UE. In some examples, inter-cell coordination can be performed to reduce or mitigate collisions.

Figure 8:
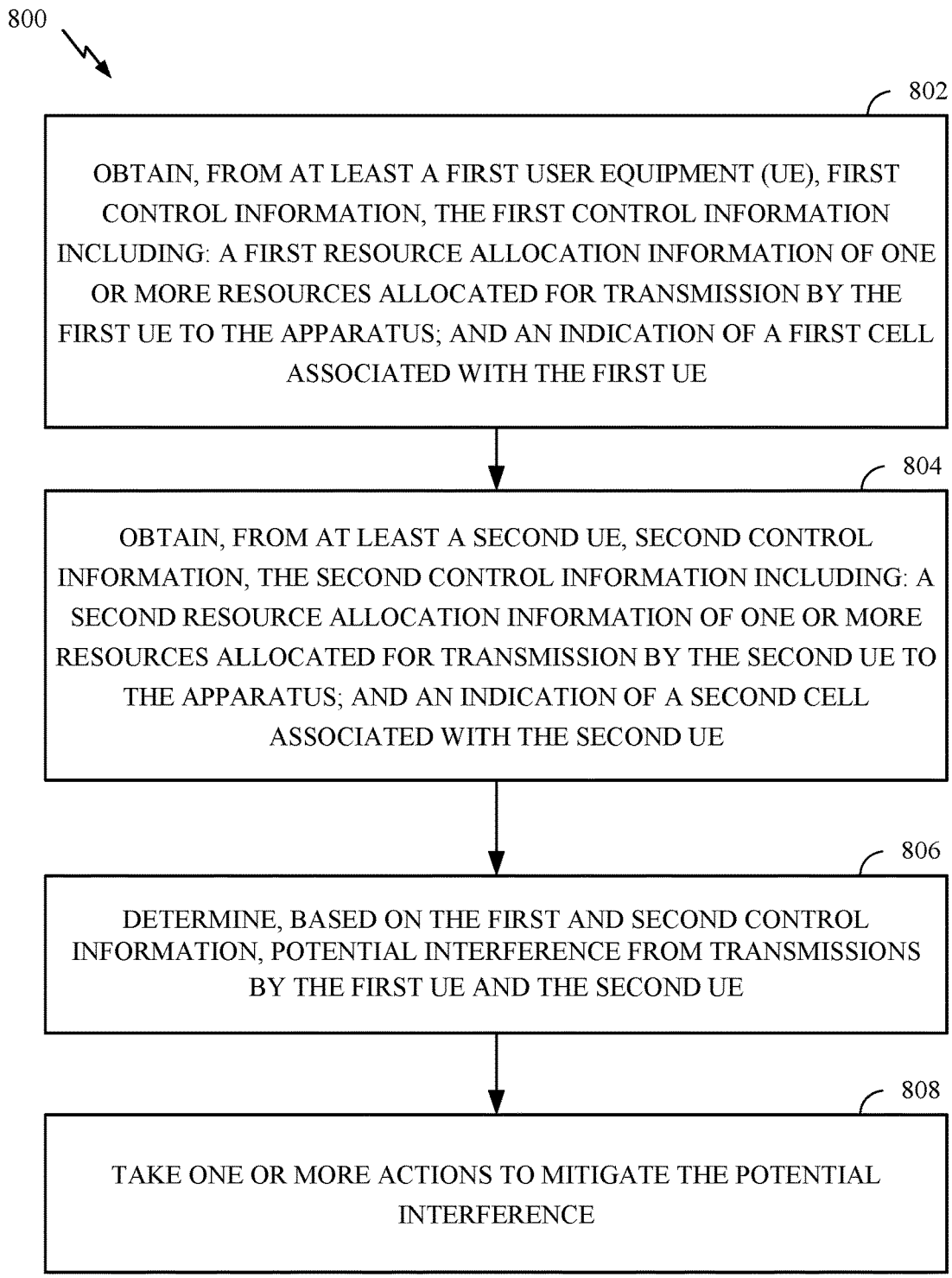
FIG. 8 is a flow diagram illustrating example operations for wireless communication by an apparatus, in accordance with certain aspects of the present disclosure.

FIG. 8 is a flow diagram illustrating example operations 800 for wireless communication, in accordance with certain aspects of the present disclosure. The operations 800 may be performed, for example, by an apparatus (e.g., the UE 120b in the wireless communication network 100). The operations 800 may be implemented as software components that are executed and run on one or more processors (e.g., controller/processor 280 of FIG. 2). Further, the transmission and reception of signals by the apparatus in operations 800 may be enabled, for example, by one or more antennas (e.g., antennas 252 of FIG. 2). In certain aspects, the transmission and/or reception of signals by the apparatus may be implemented via a bus interface of one or more processors (e.g., controller/processor 280) obtaining and/or outputting signals.

The operations 800 may begin, at 802, by obtaining, from at least a first UE, first control information. The first control information includes a first resource allocation information of one or more resources allocated for transmission by the first UE to the apparatus and an indication of a first cell associated with the first UE.

At 804, the apparatus obtains, from at least a second UE, second control information. The second control information includes a second resource allocation information of one or more resources allocated for transmission by the second UE to the apparatus and an indication of a second cell associated with the second UE.

At 806, the apparatus determines, based on the first and second control information, potential interference from transmissions by the first UE and the second UE.

At 808, the apparatus takes one or more actions to mitigate the potential interference.

Figure 9:
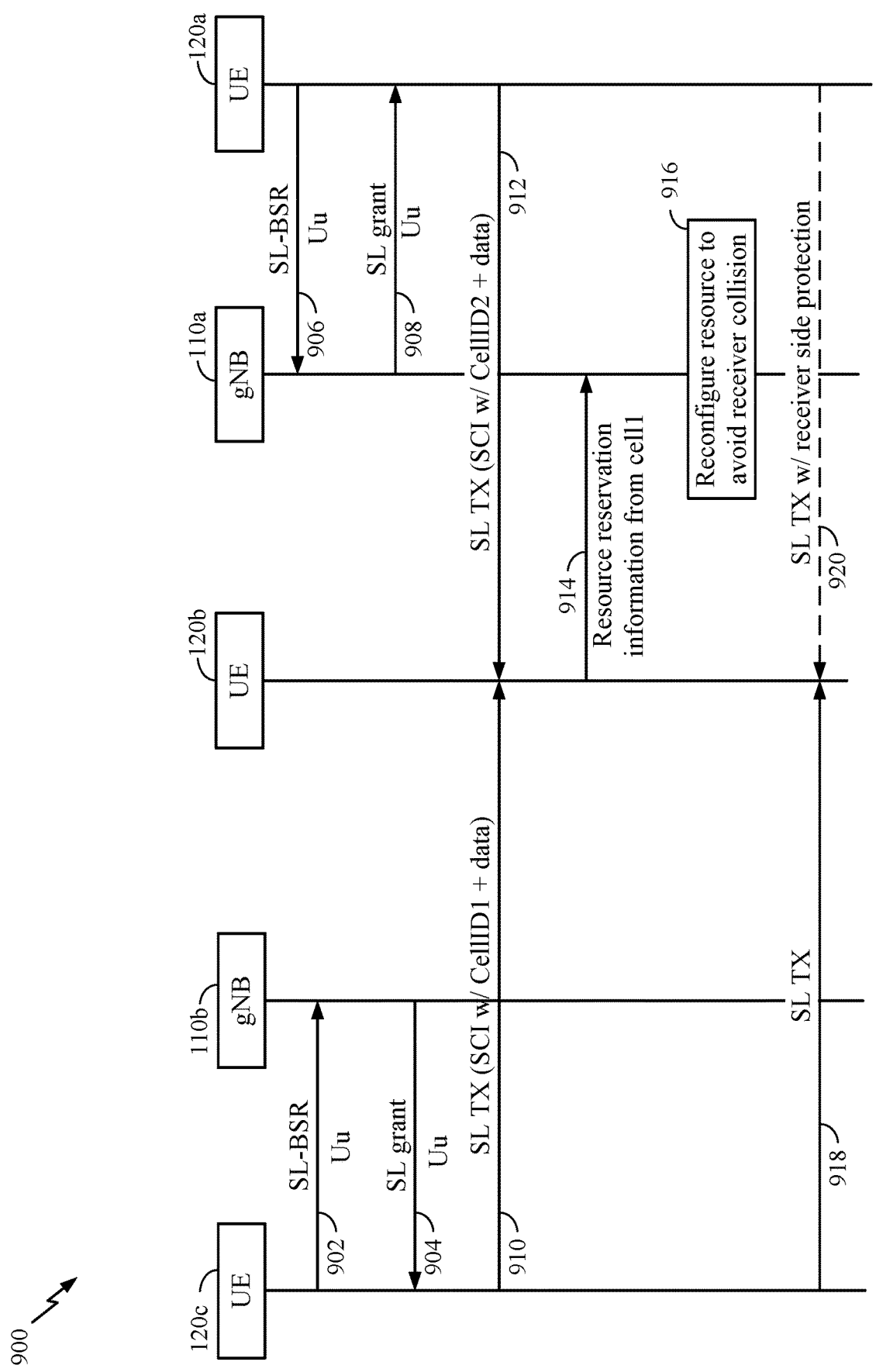
FIG. 9 is a call flow diagram illustrating example signaling for receiver side protection, in accordance with aspects of the present disclosure.

According to certain aspects, cell ID information may be included in control information (e.g., SCI) so that the receiving UE can determine potential inter-cell interference, for example, when the cell IDs are different and the grants are for overlapping resources. As shown in FIG. 9, the gNB 110a may receive a SL-BSR at 902 from the UE 120c, and the gNB 110b may receive a SL-BSR at 906 from the UE 120a. In response to the SL-BSRs, each of the gNBs 110a and 110b may, at 904 and 908, provide a sidelink grant to the UEs 120c and 120a, respectively, allocating resources for transmission to the UE 120b. In certain aspects, the grant for resources may indicate a periodic resource reservation, such as semi-persistent scheduling (SPS) resources.

In the example shown in FIG. 9, the UE 120b may belong to the serving cell of the gNB 110a. As shown, the UE 120b may receive a sidelink transmission at 910 from the UE 120c in the cell with the gNB 110b and a sidelink transmission, at 912, from the UE 120a in the cell with the gNB 110a. The sidelink transmission at 910 from the UE 120c includes SCI with the resource allocation information of the grant from the gNB 110b for sidelink transmission from the UE 120c to the UE 120b and the cell ID (cell ID 1). The sidelink transmission at 910 may also include data. The sidelink transmission at 912 from the UE 120a includes SCI with the resource allocation information of the grant from the gNB 110a for sidelink transmission from the UE 120a to the UE 120b and the cell ID (cell ID 2). The sidelink transmission at 910 may also include data.

The UE 120b can determine based on the SCIs and cell ID that the UE 120c belongs to a different cell than the UEs 120a and 120b and, therefore, that the granted transmissions may have inter-cell interference. According to certain aspects, the UE 120b may forward to the gNB 110a (e.g., via the uU link), at 914, the resource reservation information received from the UE 120c. The receipt of such resource reservation information may indicate a request for resource reconfiguration by the gNB 110a.

Based on the resource reconfiguration indication from the UE 120b, the gNB 110a may reconfigure transmission resources, at 916, to avoid inter-cell interference. For example, the gNB 110a may update the resources, such as the allocated subchannel, time slots, and/or offset for the UE 120a to avoid interference with the resources for the UE 120c. As shown in FIG. 9, at 918 the UE 120c can send its transmission to the UE 120b using its scheduled resources (e.g., in the grant from the gNB 110b). The sidelink transmission at 920 from UE 120a to UE 120b may be rescheduled to provide receiver side protection. That is, the resources which may have previously been overlapping may no longer overlap after the resource reconfiguration (e.g., the transmission at 920 uses different time and/or frequency resources than the transmission at 918).

Figure 10:
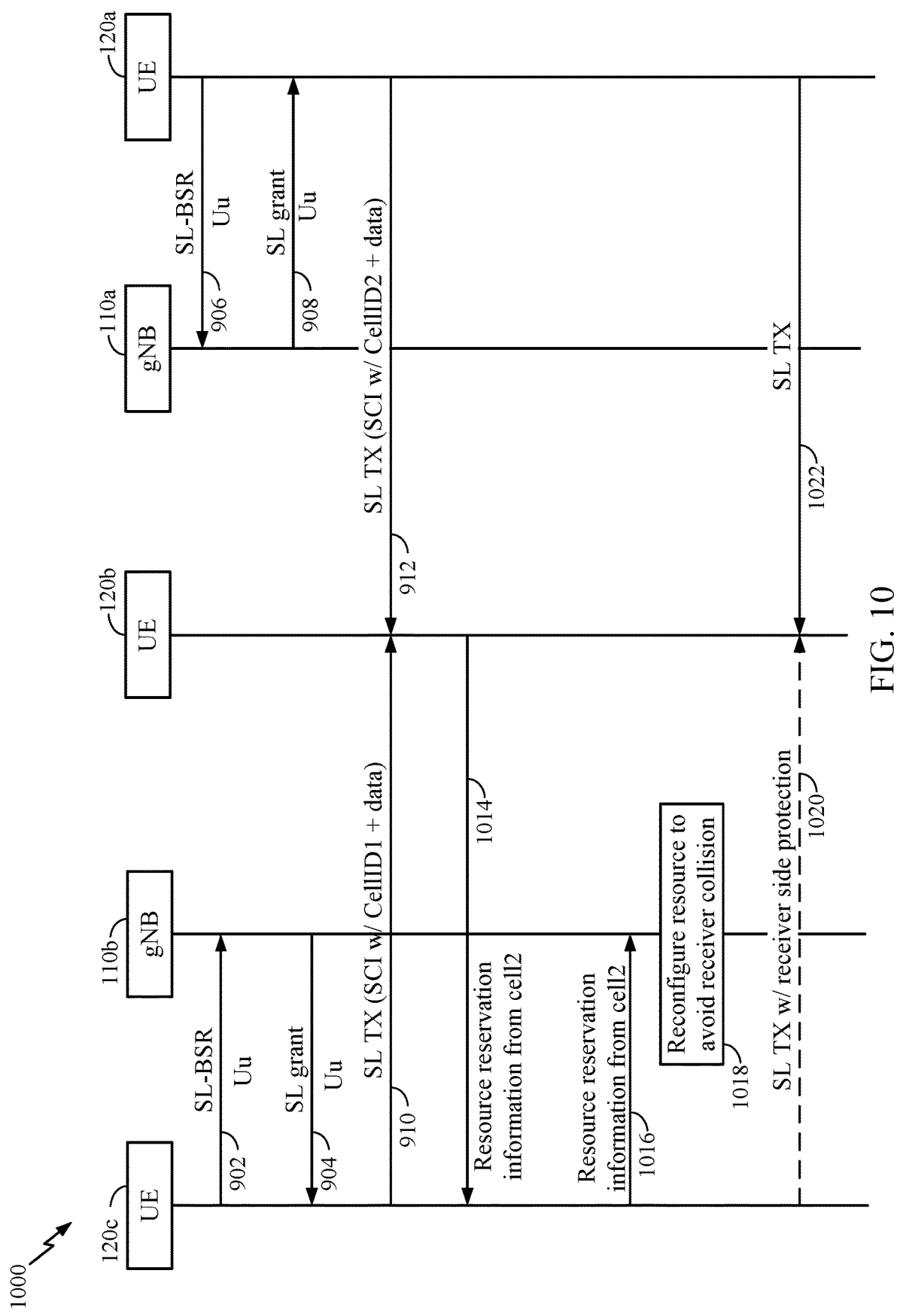
FIG. 10 is another call flow diagram illustrating example signaling for receiver side protection, in accordance with aspects of the present disclosure.

According to certain aspects, as shown FIG. 10, at 1014 the UE 120b may forward the resource reservation information from the UE 120a in its serving cell (e.g., the grant from gNB 110a), to the UE 120c. The UE 120c may then forward the resource reservation information from cell 2 to the gNB 110b at 1016. The gNB 110b may reconfigure the resources to avoid receiver collision at 1018. In this case, the sidelink transmission from the UE 120c to the UE 120b at 1020 may be rescheduled to provide receiver side protection. Thus, the transmission from the UE 120a to the UE 120b at 1022 may be transmitted as using the resources scheduled by the grant from the gNB 110a, and the transmission from the UE 120c to the UE 120b may use different time and/or frequency resources.

In some examples, a priority (e.g., L1 priority) for the resource reservation may also be included in the forwarding message. Based on the indicated priority, the gNB can determine whether, or how much, receiver side protection to apply. Such protocol may be used especially for high priority packets.

In some examples, the resource reservations (e.g., in the grants by the gNB 110c and/or the gNB 110b) may be dynamically (e.g., aperiodic) scheduled resources. According to certain aspects, to resolve inter-cell interference, the UE (e.g., the UE 120b) may perform interference cancellation, such as a successive interference cancelation (SIC) algorithm or other IC algorithm. In some examples, the IC algorithm(s) used may be based at least in part on the UE's capability.

According to certain aspects, the receiver side protection may be applied smartly. For example, the UE 120b may configured with conditions to trigger the resource reservation forwarding. In some examples, the UE 120b may be configured whether to perform the receiver protection by higher layer signaling, SL-SCI, or Uu DCI. The configuration of the UE may be based on packet priority level. For example, the UE may be configured to ensure that the packet with a higher priority level than another packet gets receiver side protection.

Figure 11:
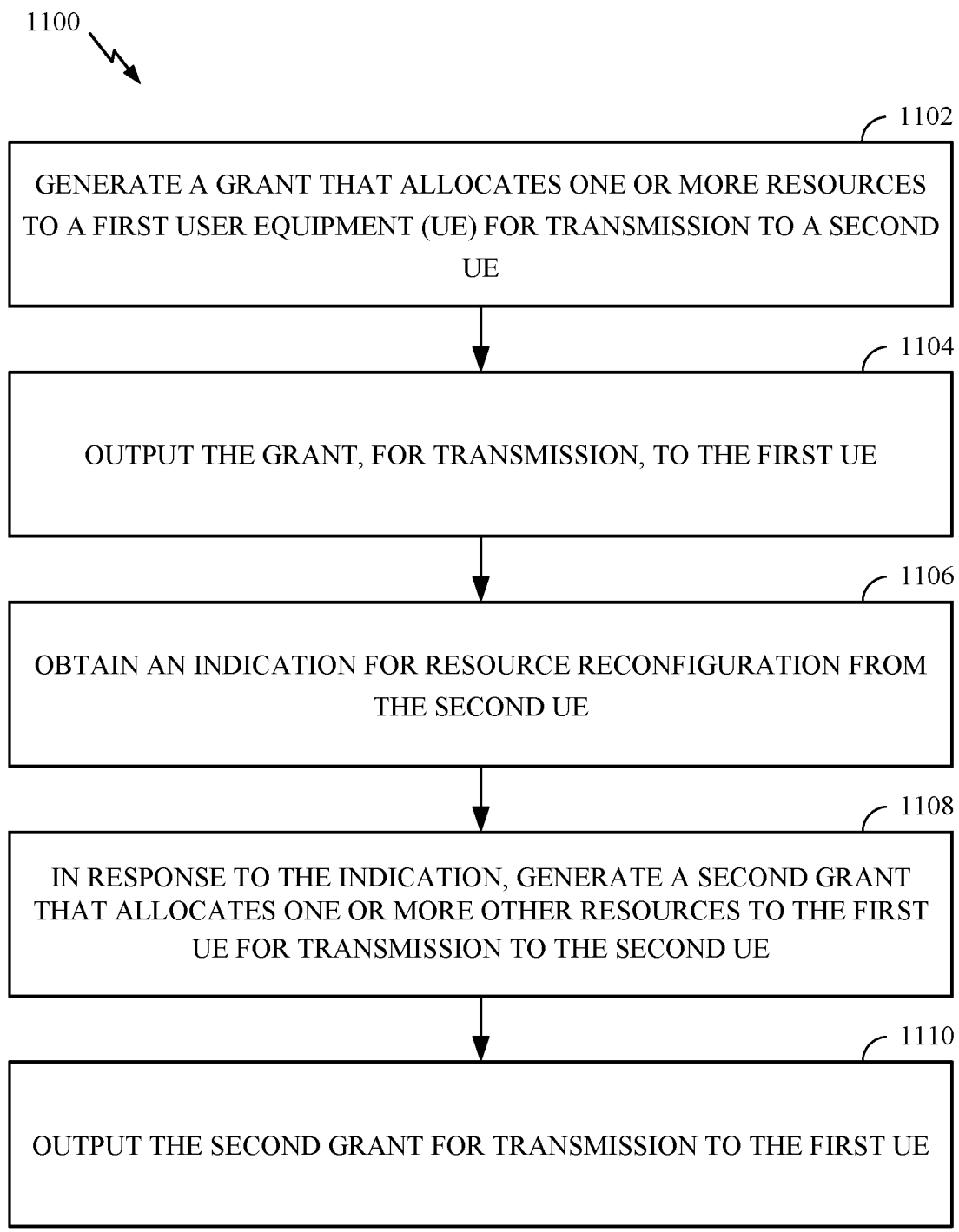
FIG. 11 is a flow diagram illustrating example operations for wireless communication by a wireless node, in accordance with certain aspects of the present disclosure.

FIG. 11 is a flow diagram illustrating example operations 1100 for wireless communication, in accordance with certain aspects of the present disclosure. The operations 1100 may be performed, for example, by a wireless node (e.g., the BS 110a and/or the BS 110b in the wireless communication network 100). The operations 1100 may be complimentary to the operations 800 performed by the UE. The operations 1100 may be implemented as software components that are executed and run on one or more processors (e.g., controller/processor 240 of FIG. 2). Further, the transmission and reception of signals by the BS in operations 1100 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1100 may begin, at 1102, by generating a grant that allocates one or more resources to a first UE for transmission to a second UE. At 1104, the apparatus outputs the grant for transmission to the first UE.

At 1106, the apparatus obtains an indication for resource reconfiguration from the second UE. At 1108, the apparatus, in response to the indication, generates a second grant that allocates one or more other resources to the first UE for transmission to the second UE. At 1110, the apparatus outputs the second grant for transmission to the first UE.

Figure 12:
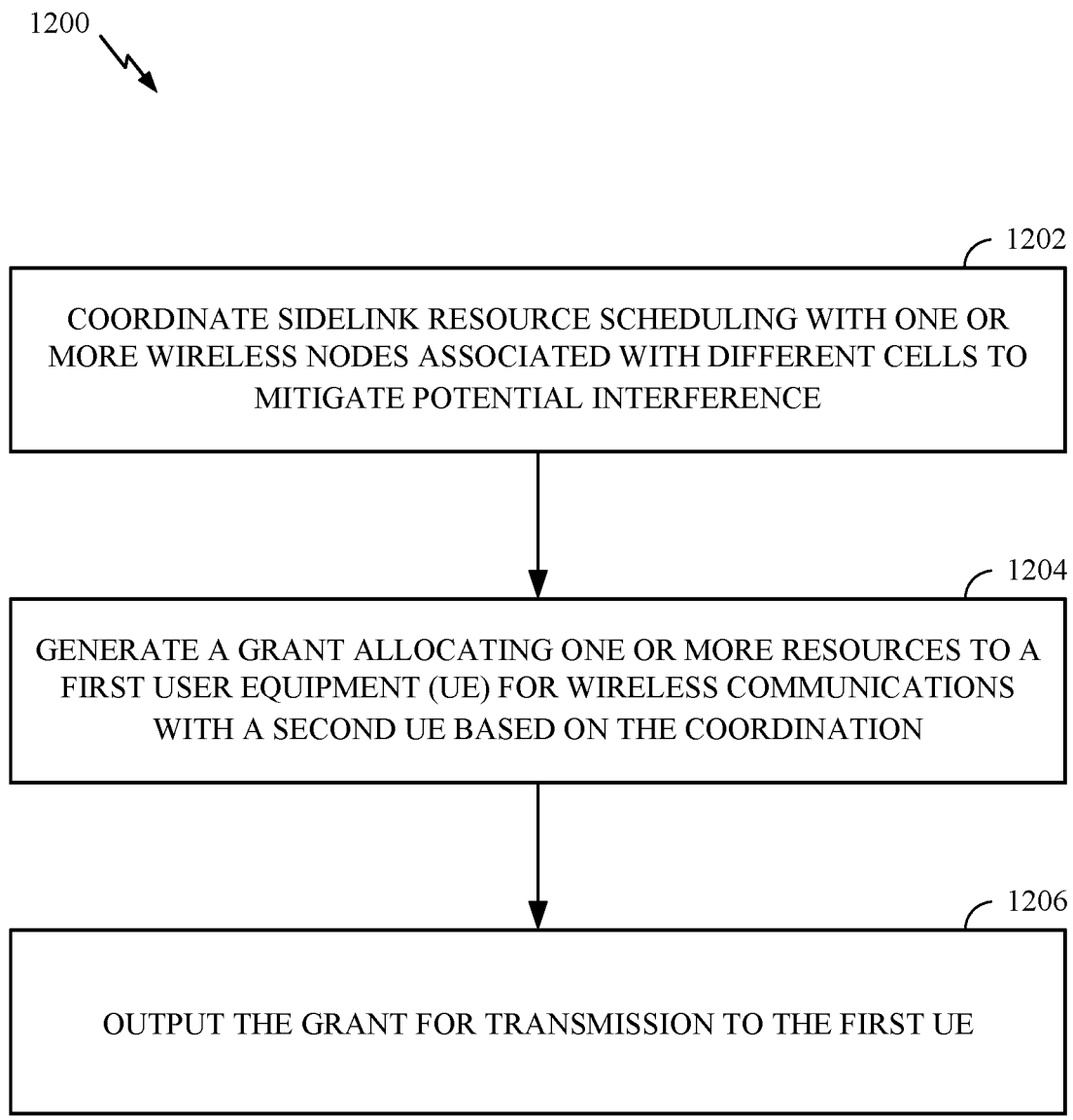
FIG. 12 is a flow diagram illustrating example operations for wireless communication by a wireless node, in accordance with certain aspects of the present disclosure.

According to certain aspects, the gNBs may coordinate resource scheduling to mitigate inter-cell interference by sidelink transmissions. FIG. 12 is a flow diagram illustrating example operations 1200 for wireless communication, in accordance with certain aspects of the present disclosure. The operations 1200 may be performed, for example, by a wireless node (e.g., the UE 120a in the wireless communication network 100). The operations 1200 may be implemented as software components that are executed and run on one or more processors (e.g., controller/processor 280 of FIG. 2). Further, the transmission and reception of signals by the apparatus in operations 1200 may be enabled, for example, by one or more antennas (e.g., antennas 252 of FIG. 2). In certain aspects, the transmission and/or reception of signals by the wireless node may be implemented via a bus interface of one or more processors (e.g., controller/processor 280) obtaining and/or outputting signals.

The operations 1200 may begin, at 1202, by coordinating sidelink resource scheduling with one or more wireless nodes associated with different cells to mitigate potential interference.

At block 1204, the wireless node generates a grant allocating one or more resources to a first user equipment (UE) for wireless communications with a second UE based on the coordination.

At block 1206, the wireless node outputs the grant for transmission to the first UE.

Figure 13:
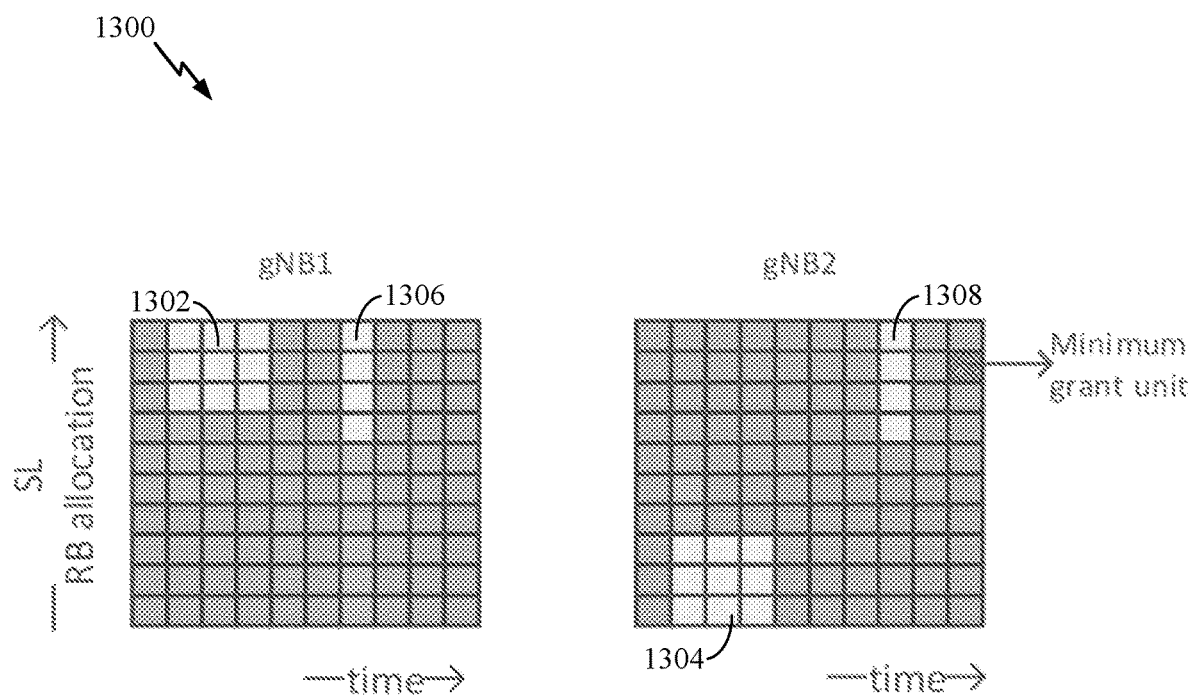
FIG. 13 is a diagram showing example resource allocations for receiver side protection, in accordance with aspects of the present disclosure.

In some examples, isolated resource block (RB) resources and/or time resources may be reserved among adjacent gNBs. As shown in FIG. 13 a gNB1 may allocate resources 1302 and 1306 for sidelink transmission, while a gNB2 may allocate resources 1304 and 1308 for sidelink transmission. As shown, each of the resource allocations may occupy different RB resources and/or time resources. In some examples, the coordination may take transmission packet priority into account. For example, resources may be reserved for transmissions having a priority level that is at or above a threshold.

Figure 14:
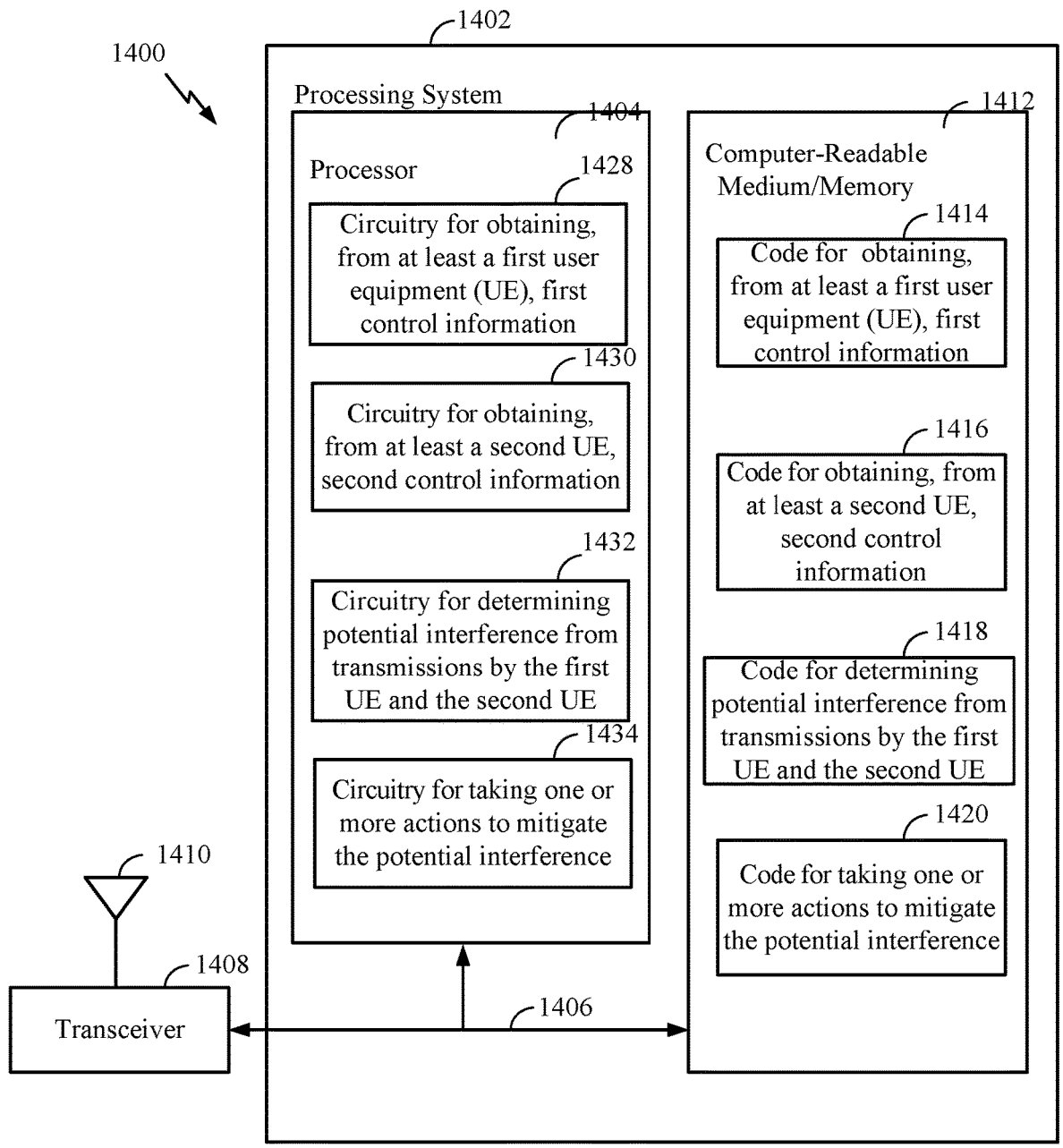
FIG. 14 illustrates a communications device that may include various components configured to perform operations for the techniques disclosed herein in accordance with aspects of the present disclosure.

FIG. 14 illustrates a communications device 1400 that may include various components (e.g., corresponding to means-plus-function components) configured to perform operations for the techniques disclosed herein, such as the operations illustrated in FIG. 8. The communications device 1400 includes a processing system 1402 coupled to a transceiver 1408 (e.g., a transmitter and/or a receiver). The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 8, or other operations for performing the various techniques discussed herein for receiver side protection in sidelink communication. In certain aspects, computer-readable medium/memory 1412 stores code 1414 for obtaining, from at least a first UE, first control information; code 1416 for obtaining, from at least a second UE, second control information; code 1418 for determining potential interference from transmissions by the first UE and the second UE; code 1420 for taking one or more actions to mitigate the potential interference; code 1422 for coordinating sidelink resource scheduling; code 1424 for generating a grant allocating one or more resources to a first user equipment; and/or code 1426 for outputting the grant for transmission to the first UE. In certain aspects, the processor 1404 has circuitry configured to implement the code stored in the computer-readable medium/memory 1412. The processor 1404 includes circuitry 1428 for obtaining, from at least a first UE, first control information; circuitry 1430 for obtaining, from at least a second UE, second control information; circuitry 1432 for determining potential interference from transmissions by the first UE and the second UE; circuitry 1434 for taking one or more actions to mitigate the potential interference; circuitry 1436 for coordinating sidelink resource scheduling; circuitry 1438 for generating a grant allocating one or more resources to a first user equipment; and/or circuitry 1440 for outputting the grant for transmission to the first UE.

Figure 15:
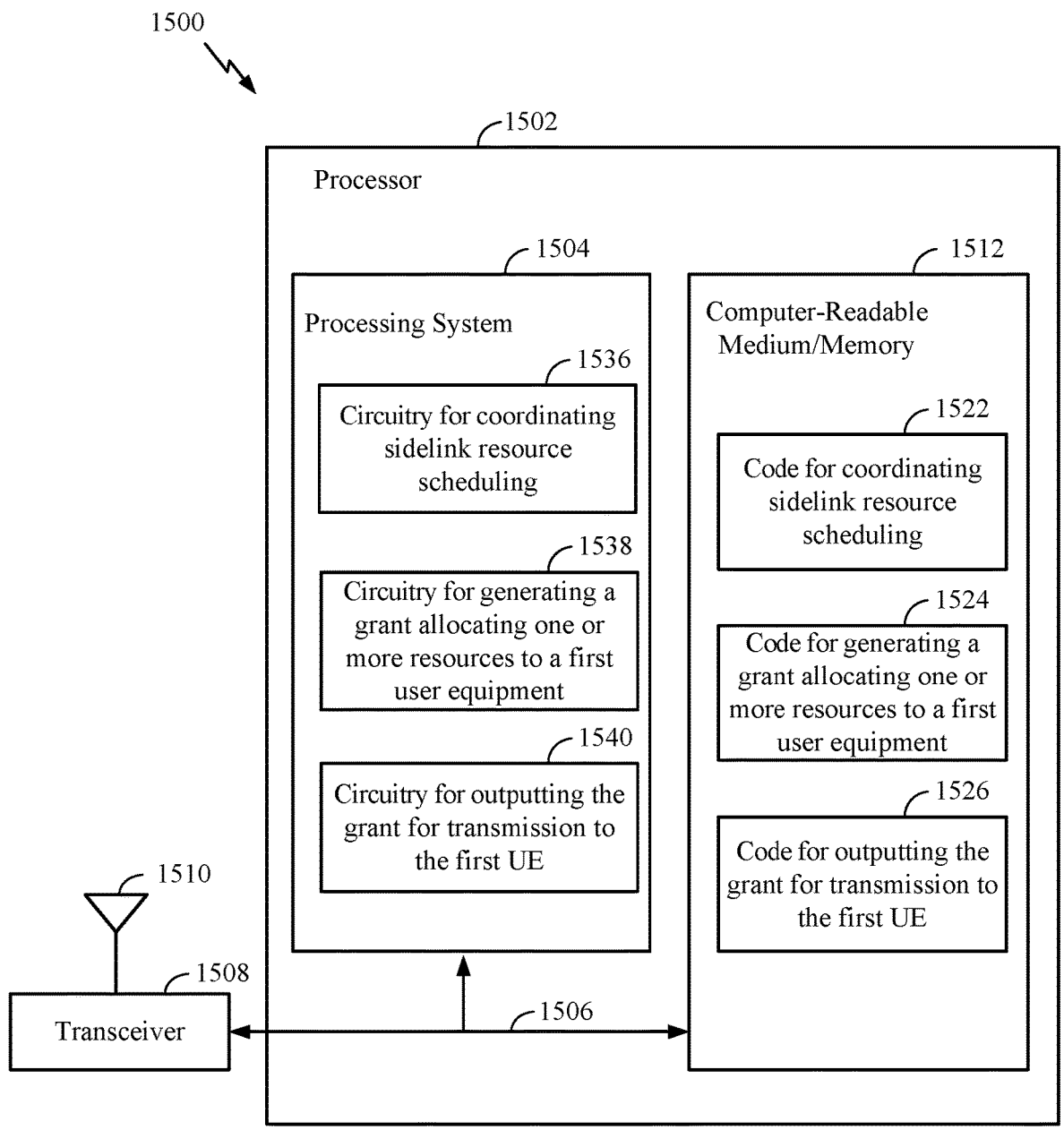
FIG. 15 illustrates a communications device that may include various components configured to perform operations for the techniques disclosed herein in accordance with aspects of the present disclosure.

FIG. 15 illustrates a communications device 1500 that may include various components (e.g., corresponding to means-plus-function components) configured to perform operations for the techniques disclosed herein, such as the operations illustrated in FIG. 10. The communications device 1500 includes a processing system 1502 coupled to a transceiver 1508 (e.g., a transmitter and/or a receiver). The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations illustrated in FIG. 10, or other operations for performing the various techniques discussed herein for receiver side protection in sidelink communication. In certain aspects, computer-readable medium/memory 1512 stores code 1522 for coordinating sidelink resource scheduling; code 1524 for generating a grant allocating one or more resources to a first user equipment; and/or code 1526 for outputting the grant for transmission to the first UE. In certain aspects, the processor 1504 has circuitry configured to implement the code stored in the computer-readable medium/memory 1512. The processor 1504 includes circuitry 1536 for coordinating sidelink resource scheduling; circuitry 1538 for generating a grant allocating one or more resources to a first user equipment; and/or circuitry 1540 for outputting the grant for transmission to the first UE.

Figure 16:
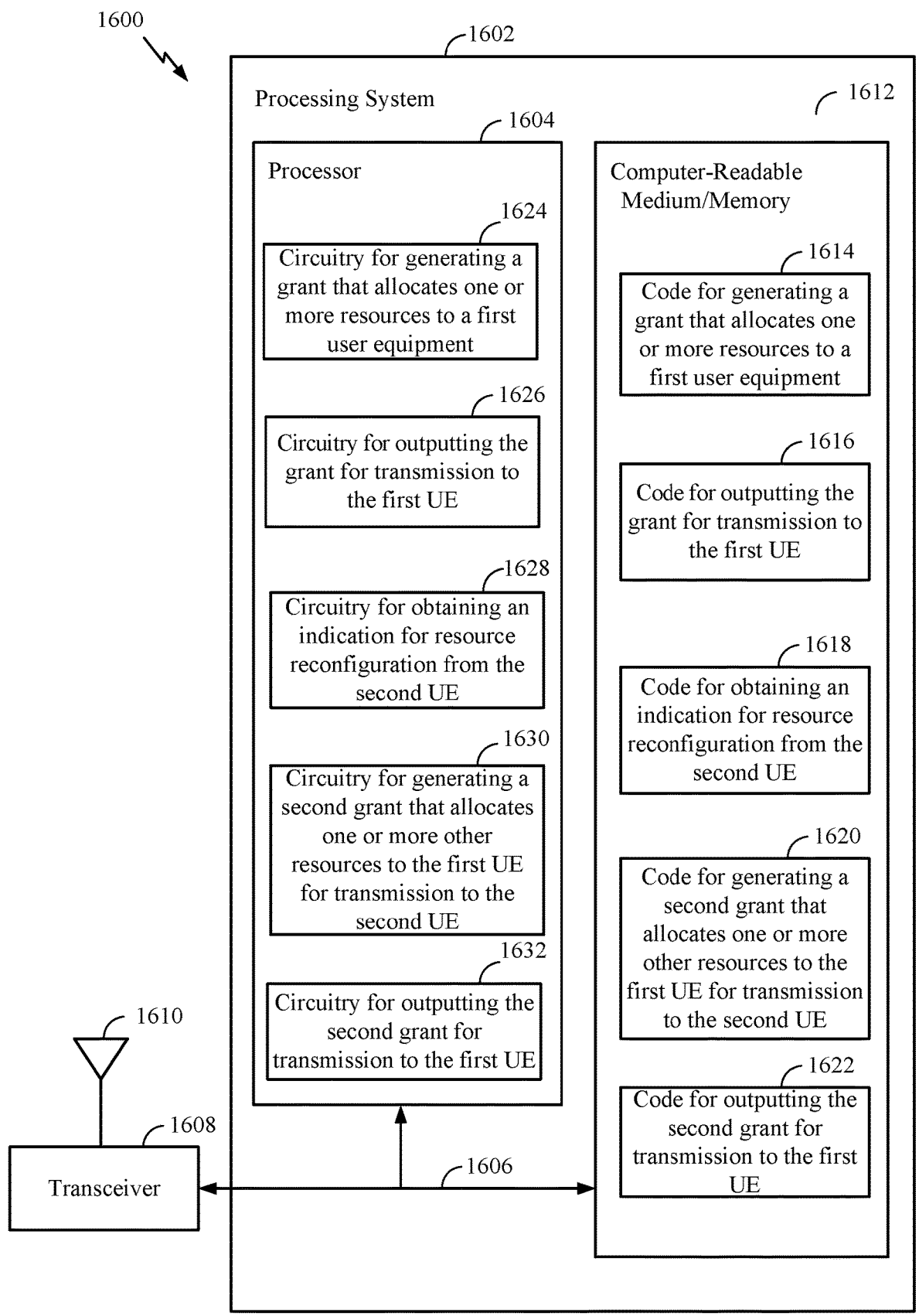
FIG. 16 illustrates a communications device that may include various components configured to perform operations for the techniques disclosed herein in accordance with aspects of the present disclosure.

FIG. 16 illustrates a communications device 1600 that may include various components (e.g., corresponding to means-plus-function components) configured to perform operations for the techniques disclosed herein, such as the operations illustrated in FIG. 9. The communications device 1600 includes a processing system 1602 coupled to a transceiver 1608 (e.g., a transmitter and/or a receiver). The transceiver 1608 is configured to transmit and receive signals for the communications device 1600 via an antenna 1610, such as the various signals as described herein. The processing system 1602 may be configured to perform processing functions for the communications device 1600, including processing signals received and/or to be transmitted by the communications device 1600.

The processing system 1602 includes a processor 1604 coupled to a computer-readable medium/memory 1612 via a bus 1606. In certain aspects, the computer-readable medium/memory 1512 is configured to store instructions (e.g., computer-executable code) that when executed by the processor 1604, cause the processor 1604 to perform the operations illustrated in FIG. 9 or other operations for performing the various techniques discussed herein for receiver side protection in sidelink communication. In certain aspects, computer-readable medium/memory 1612 stores code 1614 for generating a grant that allocates one or more resources to a first user equipment; code 1616 for outputting the grant for transmission to the first UE; code 1618 for obtaining an indication for resource reconfiguration from the second UE; code 1620 for generating a second grant that allocates one or more other resources to the first UE for transmission to the second UE; and/or code 1622 for outputting the second grant for transmission to the first UE. In certain aspects, the processor 1604 has circuitry configured to implement the code stored in the computer-readable medium/memory 1612. The processor 1604 includes circuitry 1624 for generating a grant that allocates one or more resources to a first user equipment; circuitry 1626 for outputting the grant for transmission to the first UE; circuitry 1628 for obtaining an indication for resource reconfiguration from the second UE; circuitry 1630 for generating a second grant that allocates one or more other resources to the first UE for transmission to the second UE; and/or circuitry 1632 for outputting the second grant for transmission to the first UE. In certain aspects, the processor 1604 has circuitry configured to implement the code stored in the computer-readable medium/memory 1612.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for."

For example, means for transmitting (or means for outputting for transmission) may include a transmitter and/or an antenna(s) 234 of the BS 110 or the transmitter unit 254 and/or antenna(s) 252 of the UE 120 illustrated in FIG. 2. Means for receiving (or means for obtaining) may include a receiver and/or an antenna(s) 234 of the BS 110 or a receiver and/or antenna(s) 252 of the UE 120 illustrated in FIG. 2. Means for communicating may include a transmitter, a receiver or both. Means for generating, means for performing, means for determining, means for taking action, means for determining, means for coordinating may include a processing system, which may include one or more processors, such as the transmit processor 220, the TX MIMO processor 230, the receive processor 238, and/or the controller/processor 240 of the BS 110 or the receive processor 258, the transmit processor 264, the TX MIMO processor 266, and/or the controller/processor 280 of the UE 120 illustrated in FIG. 2.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 8, FIG. 9, and/or FIG. 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A third user equipment (UE) for wireless communications, the third UE comprising:
one or more processors, individually or collectively, configured to:
obtain first control information from a first user equipment (UE), the first control information including:
a first resource allocation information of one or more resources allocated for transmission by the first UE to the third UE; and
an indication of a first cell associated with the first UE; and
obtain second control information from a second UE, the second control information including:
a second resource allocation information of one or more resources allocated for transmission by the second UE to the third UE; and
an indication of a second cell associated with the second UE; and
determine, based on the first control information and the second control information, potential interference from the transmission by the first UE and the transmission by the second UE; and
take one or more actions to mitigate the potential interference.

2. The third UE of claim 1, wherein:
the first control information comprises first sidelink control information (SCI);
the indication of the first cell comprises a cell identifier (ID) of the first cell;
the second control information comprises second SCI; and
the indication of the second cell comprises a cell ID of the second cell.

3. The third UE of claim 1, wherein the one or more processors, individually or collectively, are configured to determine the potential interference exists in response to the first cell and the second cell being different cells and the one or more resources allocated for the transmission by the first UE to the third UE overlapping the one or more resources allocated for the transmission by the second UE to the third UE.

4. The third UE of claim 1, wherein the one or more processors, individually or collectively, being configured to take the one or more actions comprises the one or more processors, individually or collectively, being configured to output an indication for resource reconfiguration for transmission to a wireless node, the first UE, or the second UE, and wherein the wireless node and the third UE are within a same cell.

5. The third UE of claim 4, wherein the one or more processors, individually or collectively, being configured to:
output the indication for resource configuration for transmission to the wireless node comprises the one or more processors, individually or collectively, being configured to forward the first resource allocation information or the second resource allocation information to the wireless node; and
output the indication for resource configuration for transmission to the first UE or the second UE cell comprises the one or more processors, individually or collectively, being configured to forward the resource allocation information of the wireless node to the first UE or the second UE.

6. The third UE of claim 4, wherein the one or more processors, individually or collectively, are configured to obtain resource reconfiguration information from the wireless node, the first UE, or the second UE, in response to the indication for resource reconfiguration.

7. The third UE of claim 1, wherein the one or more processors, individually or collectively, being configured to take the one or more actions comprises the one or more processors, individually or collectively, being configured to output an indication for resource reconfiguration to a wireless node, the first UE, or the second UE in response to the first resource allocation information and the second resource allocation information allocating periodic resources, and wherein the wireless node and the third UE are within a same cell.

8. The third UE of claim 1, wherein the one or more processors, individually or collectively, being configured to take the one or more actions comprises the one or more processors, individually or collectively, being configured to perform interference cancellation.

9. The third UE of claim 1, wherein the one or more processors, individually or collectively, being configured to take the one or more actions comprises the one or more processors, individually or collectively, being configured to perform interference cancellation in response to the first resource allocation information and the second resource allocation information allocating dynamically scheduled resources.

10. The third UE of claim 1, wherein the one or more processors, individually or collectively, are configured to obtain a third information for configuring the third UE to take the one or more actions to mitigate the potential interference.

11. The third UE of claim 10, wherein the third information comprises at least one of: radio resource control (RRC) information, sidelink control information (SCI), or downlink control information (DCI).

12. The third UE of claim 1, wherein the one or more processors, individually or collectively, are configured to take the one or more actions to mitigate the potential interference based on a packet priority level.

13. A third user equipment (UE) for wireless communications, the third UE comprising:
means for obtaining first control information from a first user equipment (UE), the first control information including:
a first resource allocation information of one or more resources allocated for transmission by the first UE to the third UE; and
an indication of a first cell associated with the first UE;
means for obtaining second control information from a second UE, the second control information including:
a second resource allocation information of one or more resources allocated for transmission by the second UE to the third UE; and
an indication of a second cell associated with the second UE;

means for determining, based on the first control information and the second control information, potential interference from the transmission by the first UE and the transmission by the second UE; and means for taking one or more actions to mitigate the potential interference.

14. The third UE of claim 13, wherein:
the first control information comprises first sidelink control information (SCI);
the indication of the first cell comprises a cell identifier (ID) of the first cell;
the second control information comprises second SCI; and
the indication of the second cell comprises a cell ID of the second cell.

15. The third UE of claim 13, wherein the means for determining the potential interference comprises means for determining the potential interface in response to the first cell and the second cell being different cells and the one or more resources allocated for the transmission by the first UE to the third UE overlapping the one or more resources allocated for the transmission by the second UE to the third UE.

16. The third UE of claim 13, wherein the means for taking the one or more actions comprises means for outputting an indication for resource reconfiguration for transmission to a wireless node, the first UE, or the second UE, and wherein the wireless node and the third UE are within a same cell.

17. The third UE of claim 16, wherein:
the means for outputting the indication for resource configuration for transmission to the wireless node comprises means for forwarding the first resource allocation information or the second resource allocation information to the wireless node; and
the means for outputting the indication for resource configuration for transmission to the first UE or the second UE comprises means for forwarding the resource allocation information of the wireless node to the first UE or the second UE.

18. The third UE of claim 16, further comprising means for obtaining resource reconfiguration information from the wireless node, the first UE, or the second UE, in response to the indication for resource reconfiguration.

19. The third UE of claim 13, wherein the means for taking the one or more actions comprises means for outputting an indication for resource reconfiguration to a wireless node, the first UE, or the second UE in response to the first resource allocation information and the second resource allocation information allocating periodic resources, and wherein the wireless node and the third UE are within a same cell.

20. The third UE of claim 13, wherein the means for taking the one or more actions comprises means for performing interference cancellation.

21. The third UE of claim 13, wherein the means for taking the one or more actions comprises means for performing interference cancellation in response to the first resource allocation information and the second resource allocation information allocating dynamically scheduled resources.

22. The third UE of claim 13, further comprising means for obtaining a third information for configuring the third UE to take the one or more actions to mitigate the potential interference.

23. The third UE of claim 22, wherein the third information comprises at least one of: radio resource control (RRC) information, sidelink control information (SCI), or downlink control information (DCI).

24. The third UE of claim 13, wherein the one or more actions taken to mitigate the potential interference are based on a packet priority level.

25. A method for wireless communications by a third user equipment (UE), the method comprising:
obtaining first control information from a first user equipment (UE), the first control information including:
a first resource allocation information of one or more resources allocated for transmission by the first UE to the third UE; and
an indication of a first cell associated with the first UE; and
obtaining second control information from a second UE, the second control information including:
a second resource allocation information of one or more resources allocated for transmission by the second UE to the third UE; and
an indication of a second cell associated with the second UE; and
determine, based on the first control information and the second control information, potential interference from the transmission by the first UE and the transmission by the second UE; and
taking one or more actions to mitigate the potential interference.

26. The method of claim 25, wherein:
the first control information comprises first sidelink control information (SCI);
the indication of the first cell comprises a cell identifier (ID) of the first cell;
the second control information comprises second SCI; and
the indication of the second cell comprises a cell ID of the second cell.

27. The method of claim 25, wherein determining the potential interference exists in response to the first cell and the second cell being different cells and the one or more resources allocated for the transmission by the first UE to the third UE overlapping the one or more resources allocated for the transmission by the second UE to the third UE.

28. The method of claim 25, wherein taking the one or more actions comprises outputting an indication for resource reconfiguration for transmission to a wireless node, the first UE, or the second UE, and wherein the wireless node and the third UE are within a same cell.

29. The method of claim 28, wherein:
outputting the indication for resource configuration for transmission to the wireless node comprises forwarding the first resource allocation information or the second resource allocation information to the wireless node; and
outputting the indication for resource configuration for transmission to the first UE or the second UE cell comprises forwarding the resource allocation information of the wireless node to the first UE or the second UE.

30. The method of claim 28, further comprising obtaining resource reconfiguration information from the wireless node, the first UE, or the second UE, in response to the indication for resource reconfiguration.

31. The method of claim 25, wherein taking the one or more actions comprises outputting an indication for resource reconfiguration to a wireless node, the first UE, or the second UE in response to the first resource allocation information and the second resource allocation information allocating periodic resources, and wherein the wireless node and the third UE are within a same cell.

32. The method of claim 25, wherein taking the one or more actions comprises performing interference cancellation.

33. The method of claim 25, wherein taking the one or more actions comprises performing interference cancellation in response to the first resource allocation information and the second resource allocation information allocating dynamically scheduled resources.

* * * * *